US006291817B1

(12) United States Patent
Kobayashi et al.

(10) Patent No.: US 6,291,817 B1
(45) Date of Patent: Sep. 18, 2001

(54) MOIRE APPARATUS HAVING PROJECTION OPTICAL SYSTEM AND OBSERVATION OPTICAL SYSTEM WHICH HAVE OPTICAL AXES PARALLEL TO EACH OTHER

(75) Inventors: Fumio Kobayashi; Shinichi Matsuda, both of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/333,660

(22) Filed: Jun. 16, 1999

(30) Foreign Application Priority Data

Jun. 23, 1998 (JP) .................................. 10-175718
Jul. 24, 1998 (JP) .................................. 10-208759
Jul. 24, 1998 (JP) .................................. 10-208760

(51) Int. Cl.$^7$ ...................................... G01B 11/00
(52) U.S. Cl. ............... 250/237 G; 356/619; 250/559.22
(58) Field of Search ..................... 356/374, 376, 356/614, 615, 616, 617, 618, 619, 620; 250/237 G, 559.22

(56) References Cited

U.S. PATENT DOCUMENTS 4,525,858 * 7/1985 Cline et al. .................. 382/1
4,564,295 * 1/1986 Halioua ...................... 356/376
5,636,025 * 6/1997 Bieman et al. ............... 356/374

FOREIGN PATENT DOCUMENTS 11-21134   6/1999 (JP) .

* cited by examiner

Primary Examiner—Stephone B. Allen
(74) Attorney, Agent, or Firm—Snider & Associates; Ronald R. Snider

(57) ABSTRACT

In a moire apparatus having a projection grating 40, three-dimensional data of an object to be measured 2 is computed from the moire fringe observed while the projection grating 40 is moved, a distance-measuring reference point P (X, Y, Z) on the object 2 is selected from the three-dimensional data, and the distance L between the distance-measuring reference point P (X, Y, Z) and a taking lens 44 is measured. The distance L can automatically be measured by detecting the peak of video output signal of a CCD camera 52 while moving its lens 52L along the optical axis. Also, the distance-measuring reference point P (X, Y, Z) may be displayed with a flag on a monitor 18 for observing the moire fringe, and the distance between the object 2 and the taking lens 44 may be measured with reference to the flag-displayed pixel. A stationary grating 102 having a pitch identical to that of the projection grating 40 is disposed near the projection grating 40, so as to form a moire fringe. From the change in this moire fringe generated when the projection grating 40 is moved, the amount of movement of the projection grating 40 is computed. The change in moire fringe is detected when a photocell 104 placed near the stationary grating 102 detects the illuminance of the moire fringe.

12 Claims, 18 Drawing Sheets

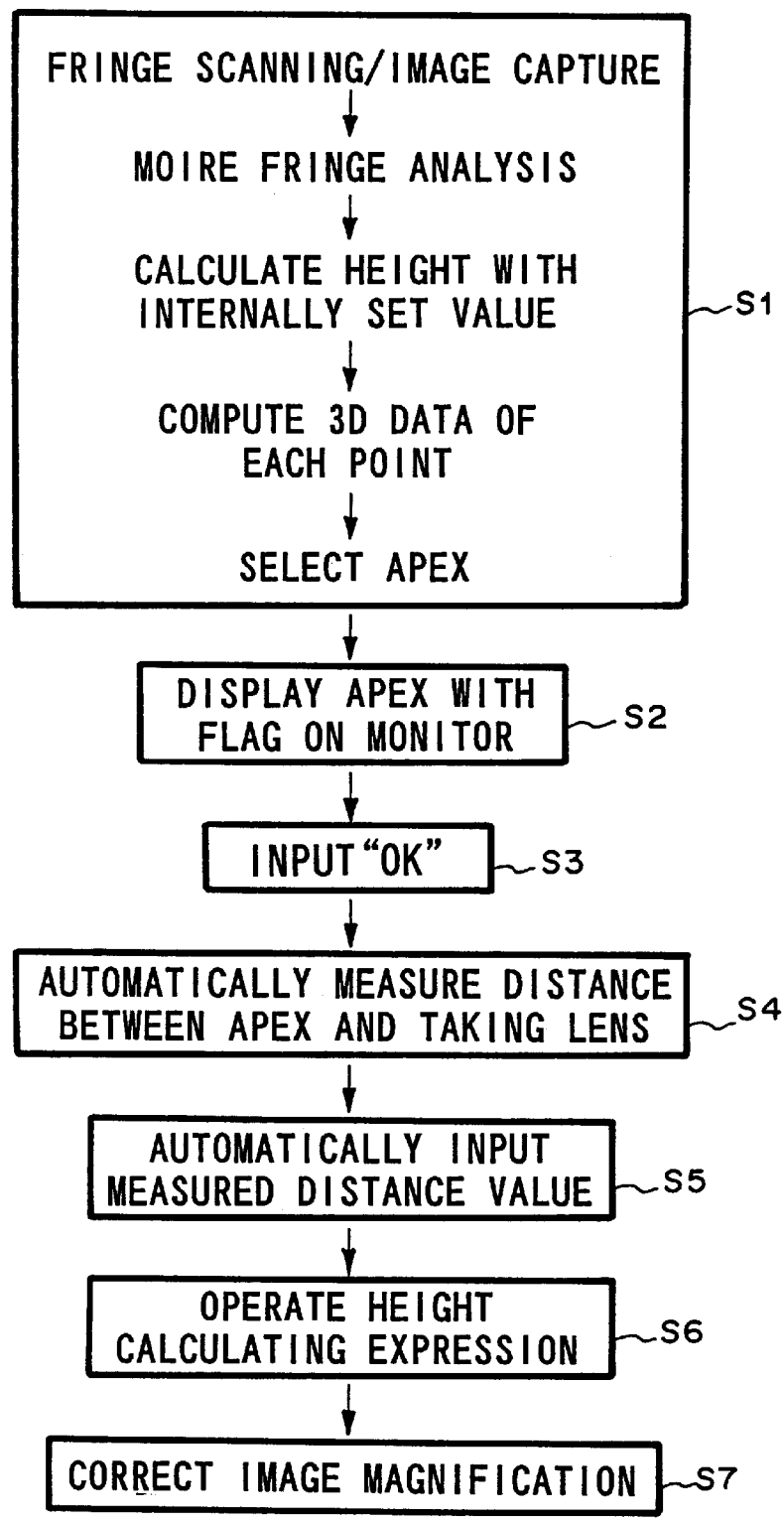

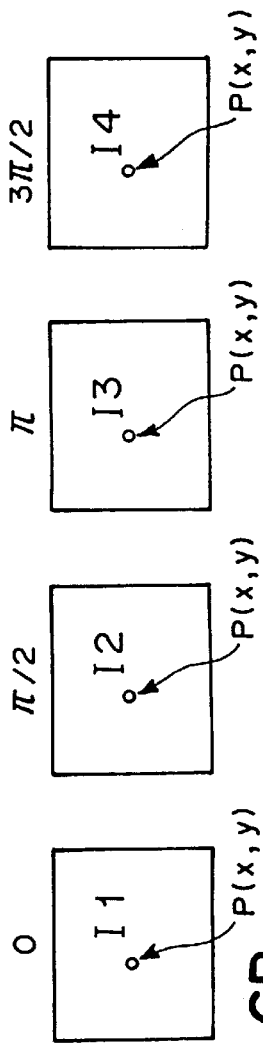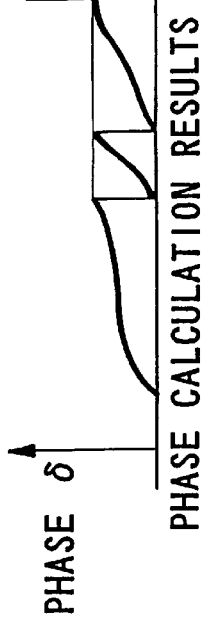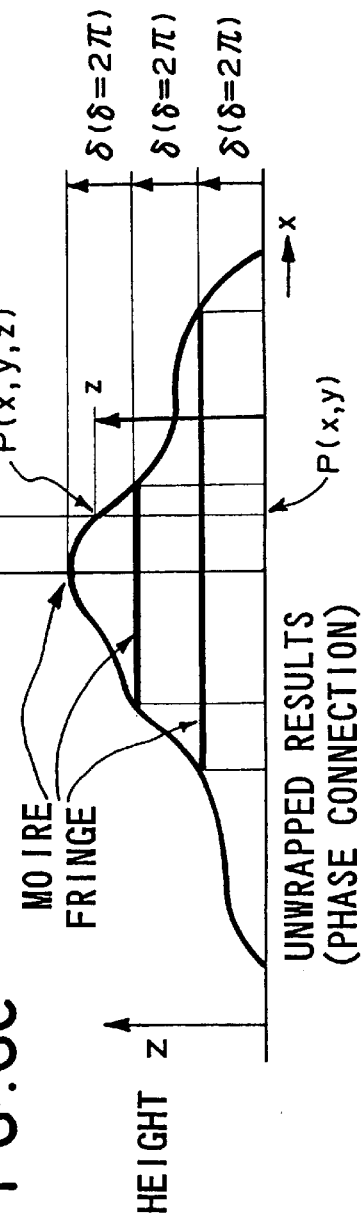
FIG.6A
FIG.6B
FIG.6C

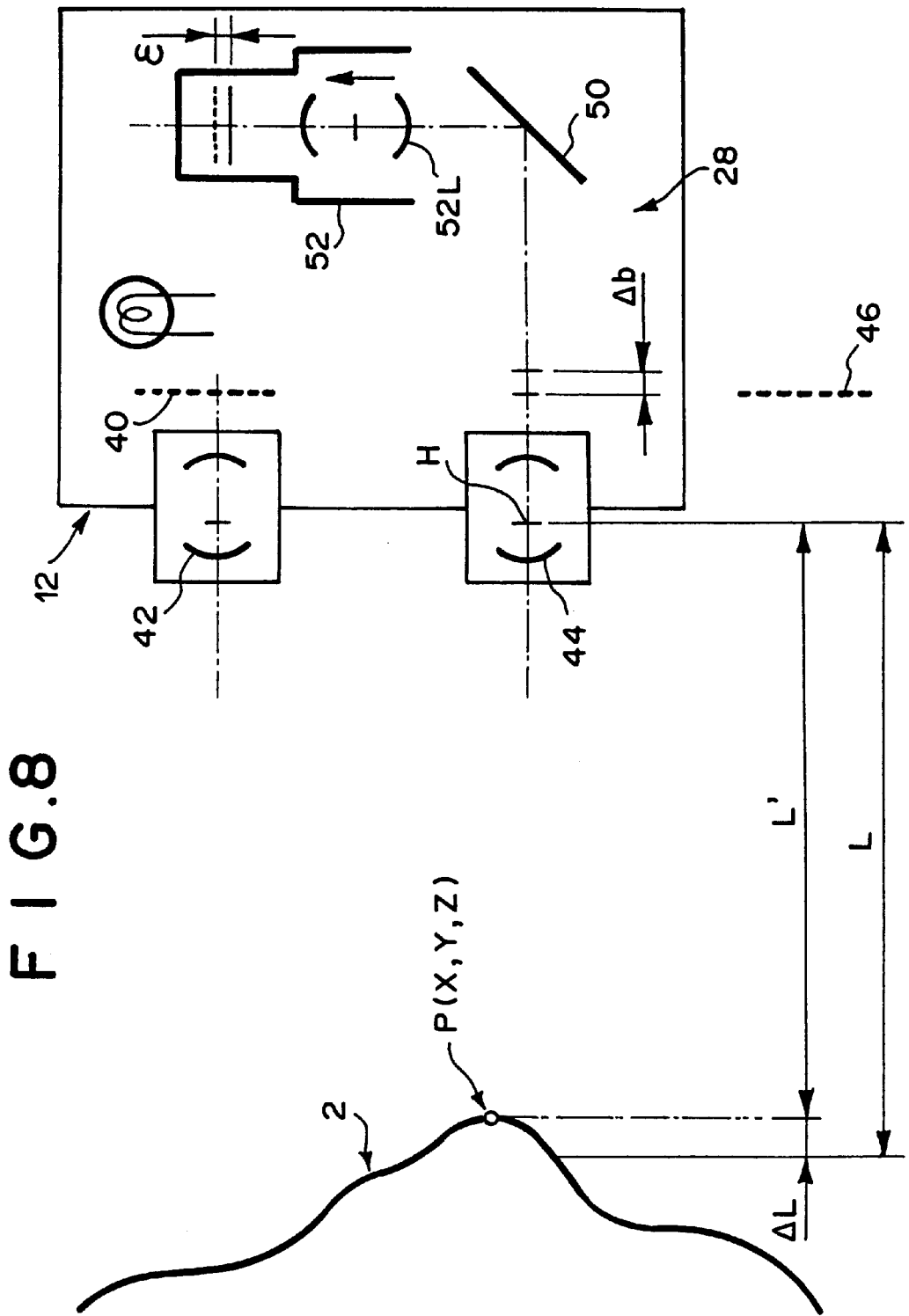

SCANNING LINE

F I G. 18
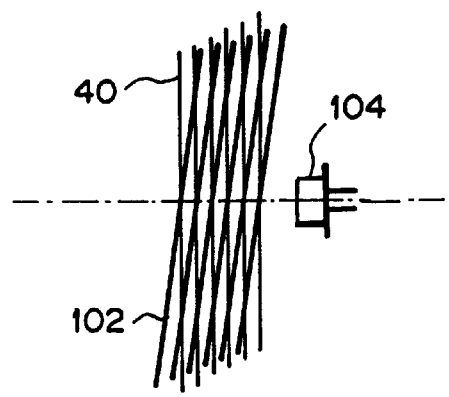
F I G. 19
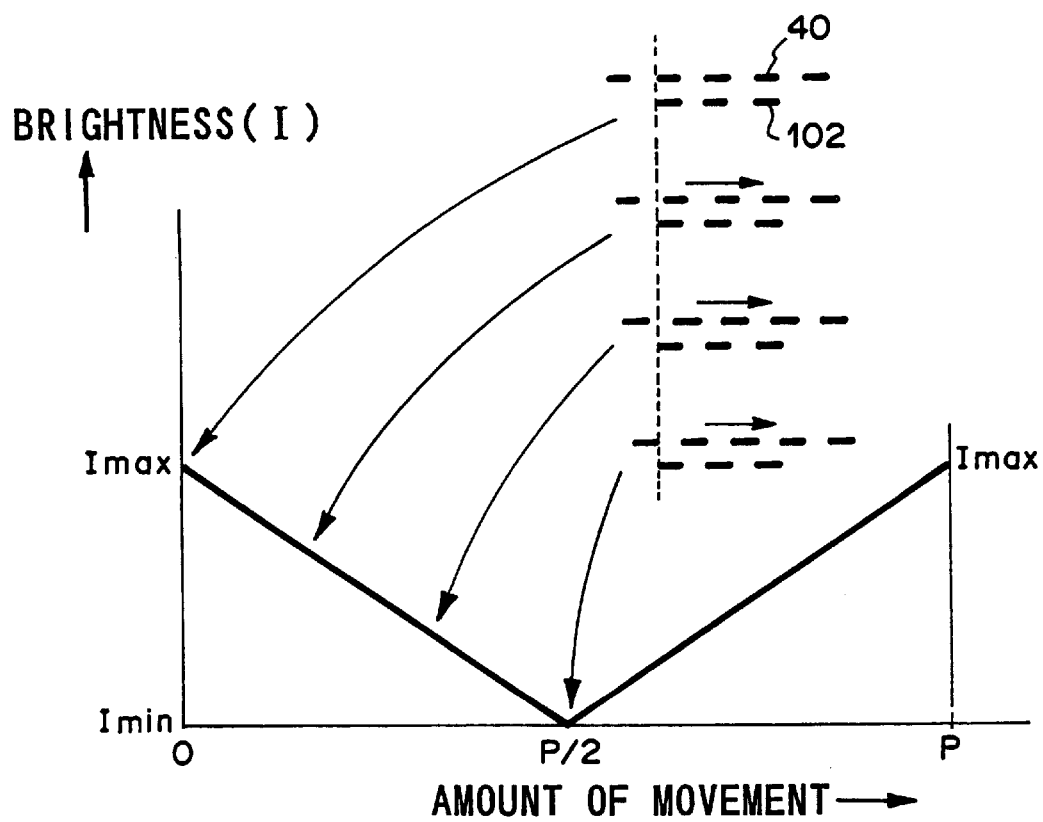

F I G. 20
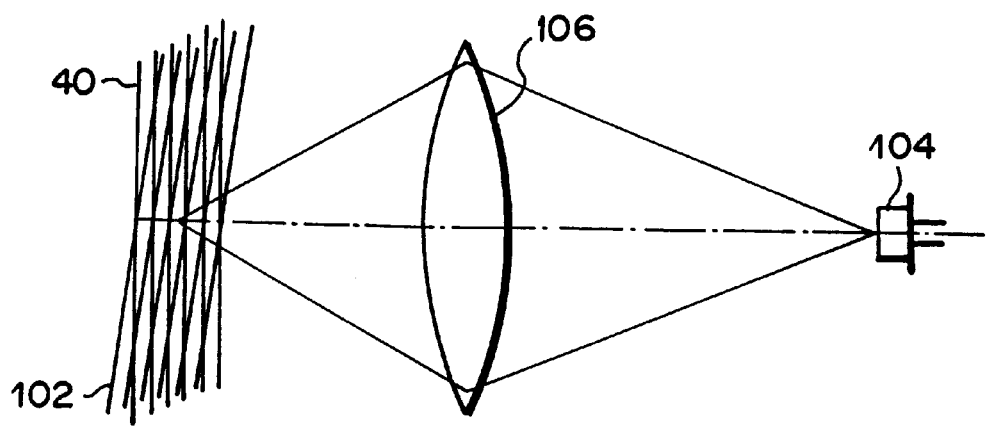
F I G. 21
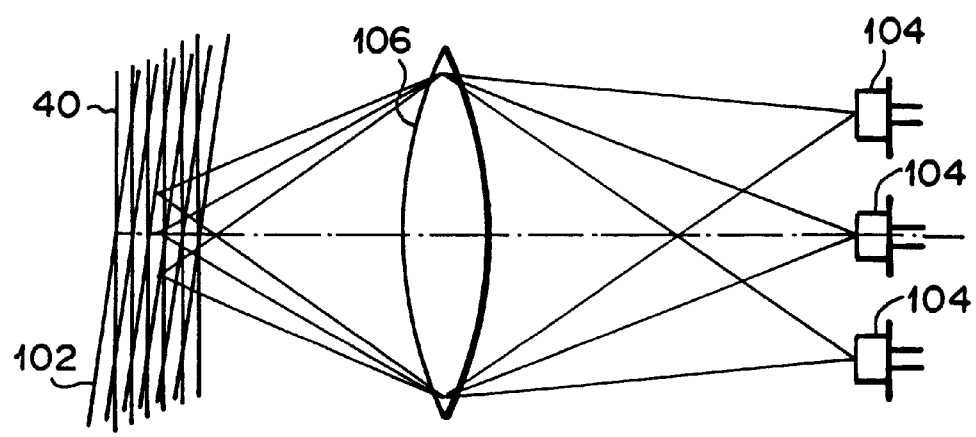

AMOUNT OF MOVEMENT →

MOIRE APPARATUS HAVING PROJECTION OPTICAL SYSTEM AND OBSERVATION OPTICAL SYSTEM WHICH HAVE OPTICAL AXES PARALLEL TO EACH OTHER

RELATED APPLICATIONS

This application claims the priorities of Japanese Patent Application No. 10-175718 filed on Jun. 23, 1998, Japanese Patent Application No. 10-208759 filed on Jul. 24, 1998, and Japanese Patent Application No. 10-208760 filed on Jul. 24, 1998, which are incorporated herein by reference.

BACKGROUND OF THE INVENTION

1. Field of the Invention

The present invention relates to a so-called grating projection type moire apparatus; and, in particular, to a moire apparatus equipped with a fringe scanning function.

2. Description of the Prior Art

Moire apparatus have conventionally been known as an apparatus for easily capturing three-dimensional form information of an object to be measured in a short time. As the moire apparatus, those of a grating irradiation type and a grating projection type have been known, among which the degree of freedom in measurement of the object to be measured is higher in the latter since they do not need such a large reference grating as that of the former.

The grating projection type moire apparatus comprises a projection optical system and an observation optical system having their respective optical axes parallel to each other, and is configured such that an image of a projection grating is projected by the projection optical system onto an object to be measured, a deformed grating image formed on the object is focused by the observation optical system onto an observation reference grating, and the resulting moire fringe is observed. Here, if fringe scanning, by which the projection grating is moved in a direction orthogonal to the grating lines of both gratings within a plane orthogonal to both optical axes, is carried out, then whether the object is protruded or depressed can be determined, and phase connection can be made, whereby three-dimensional form information of the object can be obtained.

Since the moire fringe appearing on the monitor for observing the moire fringe is captured by way of the observation optical system, the actual depth of the moire fringe formed at a position on the object to be measured near the taking lens of the observation optical system differs from that of the moire fringe formed at a position far from the taking lens, even when they have the same grating line interval. Consequently, for obtaining correct three-dimensional form information of the object to be measured, it is necessary to correct the image magnification and sensitivity according to the position of each point on the object in the depth direction.

While it is necessary to carry out the image magnification correction and sensitivity correction according to the absolute distance between each point of the object to be measured and the taking lens of the observation optical system, the distance between the object and the taking lens must be measured separately from the moire fringe observation, since the three-dimensional data of the object computed from the moire fringe is inevitably relative positional data on the object.

This distance measurement is mainly carried out by a manual operation in which a measure is placed between a given point on the object and the taking lens, and its scale is read out. In such a measuring method, it is difficult to correctly measure the distance. As a consequence, it is problematic in that the image magnification correction cannot be carried out accurately.

Also, while the distance measurement is carried out by the above-mentioned manual operation with a measure or the like, or measurement using a measuring device or the like, the point subjected to the distance measurement on the object to be measured is also a reference point for the image magnification correction and sensitivity correction. Consequently, for accurately performing the image magnification correction and sensitivity correction, it is important to correctly grasp the position of this point within a plane orthogonal to the depth direction.

Further, while the above-mentioned fringe scanning is carried out by a driving means such as a pulse motor, the driving is effected in an open loop manner, whereby the reliability of fringe scanning accuracy is not always sufficient, which is desired to be improved.

SUMMARY OF THE INVENTION

In view of such circumstances, it is an object of the present invention to provide a grating projection type moire apparatus equipped with a fringe scanning function, which can improve the accuracy in image magnification correction and sensitivity correction necessary for obtaining correct three-dimensional form information of the object to be measured.

It is another object of the present invention to provide a grating projection type moire apparatus equipped with a fringe scanning function, which can improve the fringe scanning accuracy.

The moire apparatus in accordance with a first aspect of the present invention is configured such that a distance-measuring reference point on an object to be measured is automatically selected at the time of moire fringe observation, and the distance between the distance-measuring reference point and the taking lens is automatically measured, whereby the aimed objects are achieved.

Namely, the moire apparatus in accordance with the first aspect of the present invention is a moire apparatus comprising a projection optical system and an observation optical system which have optical axes parallel to each other, the apparatus being configured such that an image of a projection grating is projected by the projection optical system onto an object to be measured, a deformed grating image formed on the object is focused by the observation optical system onto an observation reference grating, and a moire fringe formed thereby is observed, the projection grating being movable in a direction orthogonal to grating lines of both of the gratings within a plane orthogonal to both of the optical axes;

wherein three-dimensional data of the object is computed from the moire fringe observed while the projection grating is moved, a distance-measuring reference point on the object is selected from the three-dimensional data, and a distance between the distance-measuring reference point and a taking lens of the observation optical system is automatically measured.

Though any point on the object to be measured can be employed as the distance-measuring reference point, the image magnification correction and the sensitivity correction can easily be carried out if an apex of the object is set as the reference point.

Thus, the distance-measuring reference point is preferably an apex of the object to be measured.

The automatic measurement may be performed such that the light quantity of reflected light from the object to be measured is detected, and a peak is detected according to thus detected light quantity.

The moire apparatus in accordance with a second aspect of the present invention is configured such that a distance-measuring reference point on an object to be measured is displayed with a flag on a monitor for observing a moire fringe, whereby the distance between the object and a taking lens of the observation optical system can be measured accurately.

Namely, the moire apparatus in accordance with the second aspect of the present invention is a moire apparatus comprising a projection optical system and an observation optical system which have optical axes parallel to each other, the apparatus being configured such that an image of a projection grating is projected by the projection optical system onto an object to be measured, a deformed grating image formed on the object is focused by the observation optical system onto an observation reference grating, and a moire fringe formed thereby is observed, the projection grating being movable in a direction orthogonal to grating lines of both of the gratings within a plane orthogonal to both of the optical axes;

wherein three-dimensional data of the object is computed from the moire fringe observed while the projection grating is moved, a distance-measuring reference point on the object is selected from the three-dimensional data, and the distance-measuring reference point is displayed with a flag on a monitor for observing the moire fringe.

Though any point on the object to be measured can be employed as the distance-measuring reference point, the image magnification correction and the sensitivity correction can easily be carried out if an apex of the object is set as the reference point.

Thus, the distance-measuring reference point is preferably an apex of the object to be measured.

The moire apparatus in accordance with a third aspect of the present invention is configured such that a predetermined stationary grating is disposed at a position near a projection grating, so as to form a moire fringe, and a change in this moire fringe is used for calculating an amount of movement of the projection grating.

Namely, the moire apparatus in accordance with the third aspect of the present invention is a moire apparatus comprising a projection optical system and an observation optical system which have optical axes parallel to each other, the apparatus being configured such that an image of a projection grating is projected by the projection optical system onto an object to be measured, a deformed grating image formed on the object is focused by the observation optical system onto an observation reference grating, and a moire fringe formed thereby is observed, the projection grating being movable in a direction orthogonal to grating lines of both of the gratings within a plane orthogonal to both of the optical axes;

wherein a stationary grating having a pitch identical to that of the projection grating is disposed at a position near the projection grating so as to form a moire fringe by both of the gratings, and a change in thus formed moire fringe caused by the movement of the projection grating is detected so as compute an amount of movement of the projection grating.

The stationary grating may have grating lines intersecting those of the projection grating.

Preferably, the change in the moire fringe is detected by detection of illuminance of a single point.

Preferably, the change in the moire fringe is detected by means of a plurality of illuminance detecting means.

BRIEF DESCRIPTION OF THE DRAWINGS

FIG. 5 is a flowchart showing a procedure of apex selection, distance measurement, and image magnification correction, which is carried out at the time of moire fringe observation by the moire apparatus shown in FIG. 1;

FIGS. 6A to 6C are schematic views for explaining a specific procedure of selecting an apex by moire fringe measurement;

FIG. 8 is a schematic view for explaining a method of automatically measuring the distance between an apex and a taking lens of an observation optical system;

FIG. 18 is a view showing the positional relationship between the stationary grating and photocell shown in FIG. 3;

FIG. 19 is a graph showing an operation of the moire apparatus shown in FIG. 1;

FIG. 20 is a view, similar to FIG. 18, showing a first modified example of the moire apparatus shown in FIG. 1;

FIG. 21 is a view, similar to FIG. 18, showing a second modified example of the moire apparatus shown in FIG. 1;

DESCRIPTION OF THE PREFERRED EMBODIMENTS

In the following, embodiments of the present invention will be explained with reference to the accompanying drawings.

Figure 1:
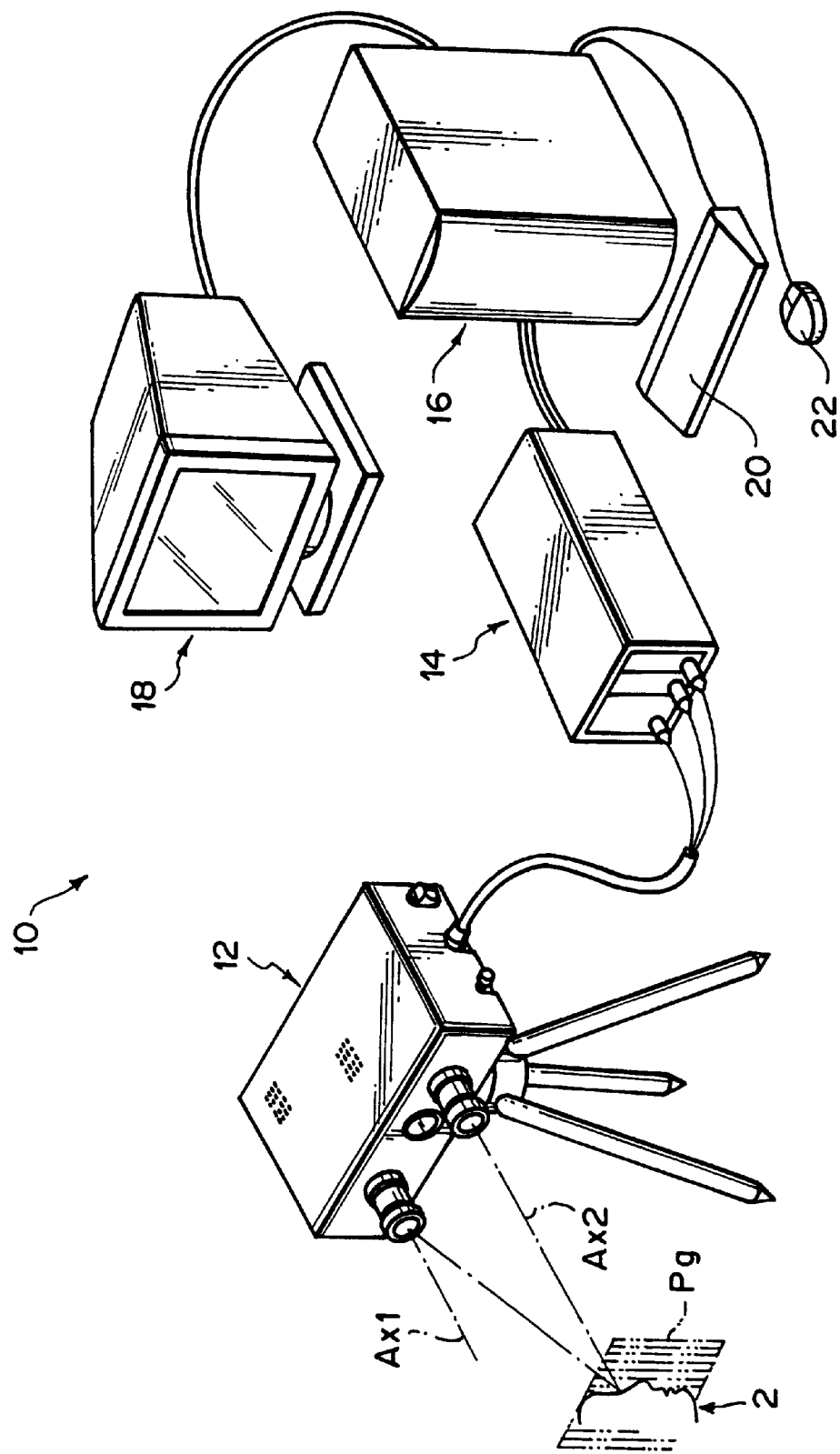
FIG. 1 is a perspective view showing the overall configuration of the moire apparatus in accordance with an embodiment of the present invention.

FIG. 1 is a perspective view showing the moire apparatus (three-dimensional image scanner) in accordance with an embodiment of the present invention.

As depicted, this moire apparatus 10 comprises a measurement head (including the main body of the moire apparatus) 12, a power equipment driving section 14, a control section 16, and a monitor 18; and is configured such that three-dimensional form information and pattern (texture) information of an object to be measured 2 are captured by the measurement head 12, and thus captured three-dimensional form information and pattern information are fed to the control section 16 by way of the power equipment driving section 14, and the three-dimensional form information and texture information are combined together in the control section 16 so as to form an three-dimensional image of the object 2, which is displayed onto the monitor 18. Connected to the control section 16 are a keyboard 20 and a mouse 22, by which displayed contents can be switched, for example, so as to change the display angle of the three-dimensional image on the monitor 18.

The measurement head 12 captures the three-dimensional form information by using a grating projection type moire topography. In FIG. 1, a grating plane Pg indicated by dash-double-dot lines in front of the measurement head 12 is a virtual reference grating plane in the grating projection type moire topography.

Figure 2:
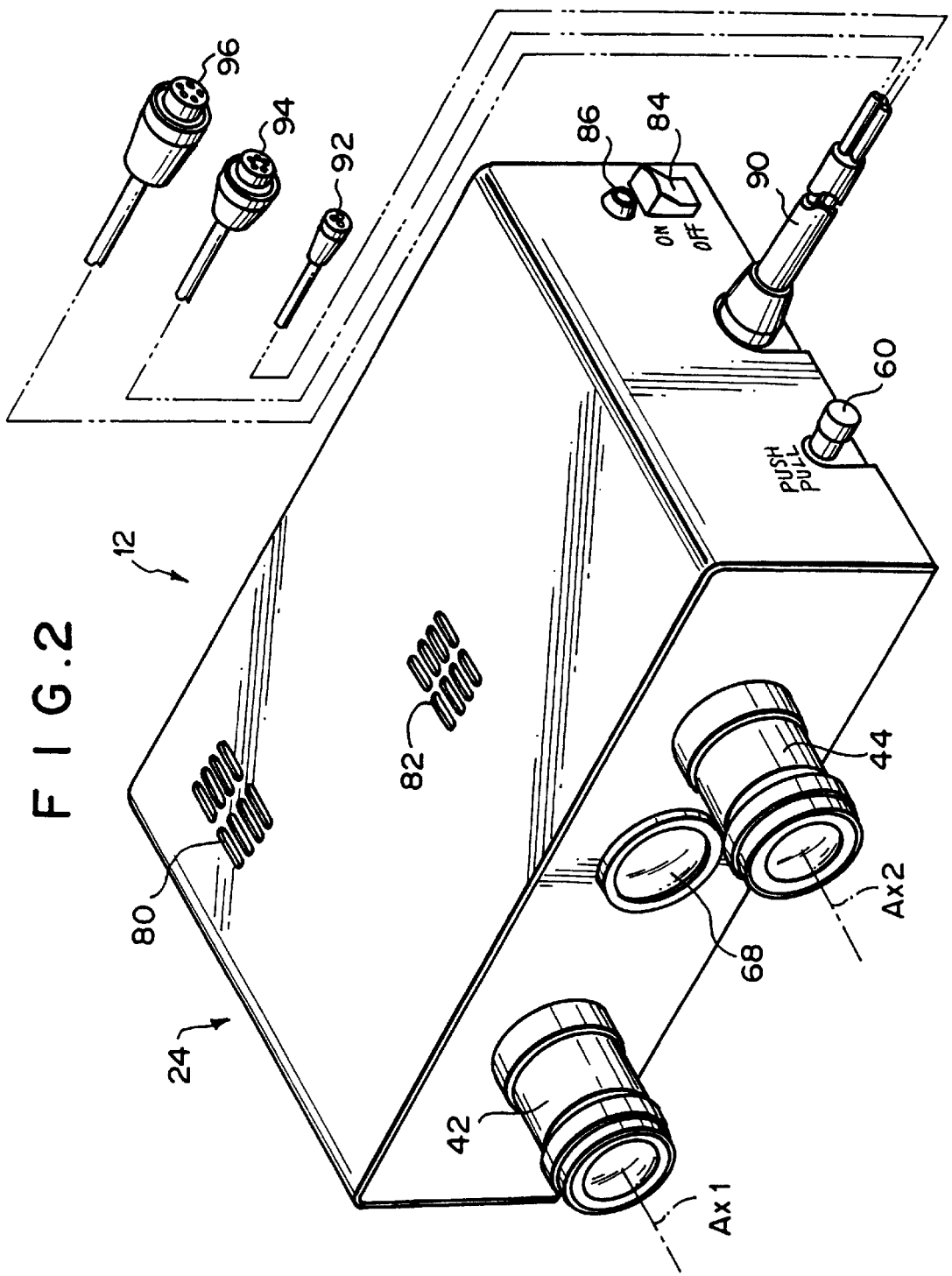
FIG. 2 is a perspective view showing the exterior of the measurement head in the moire apparatus shown in FIG. 1.
Figure 3:
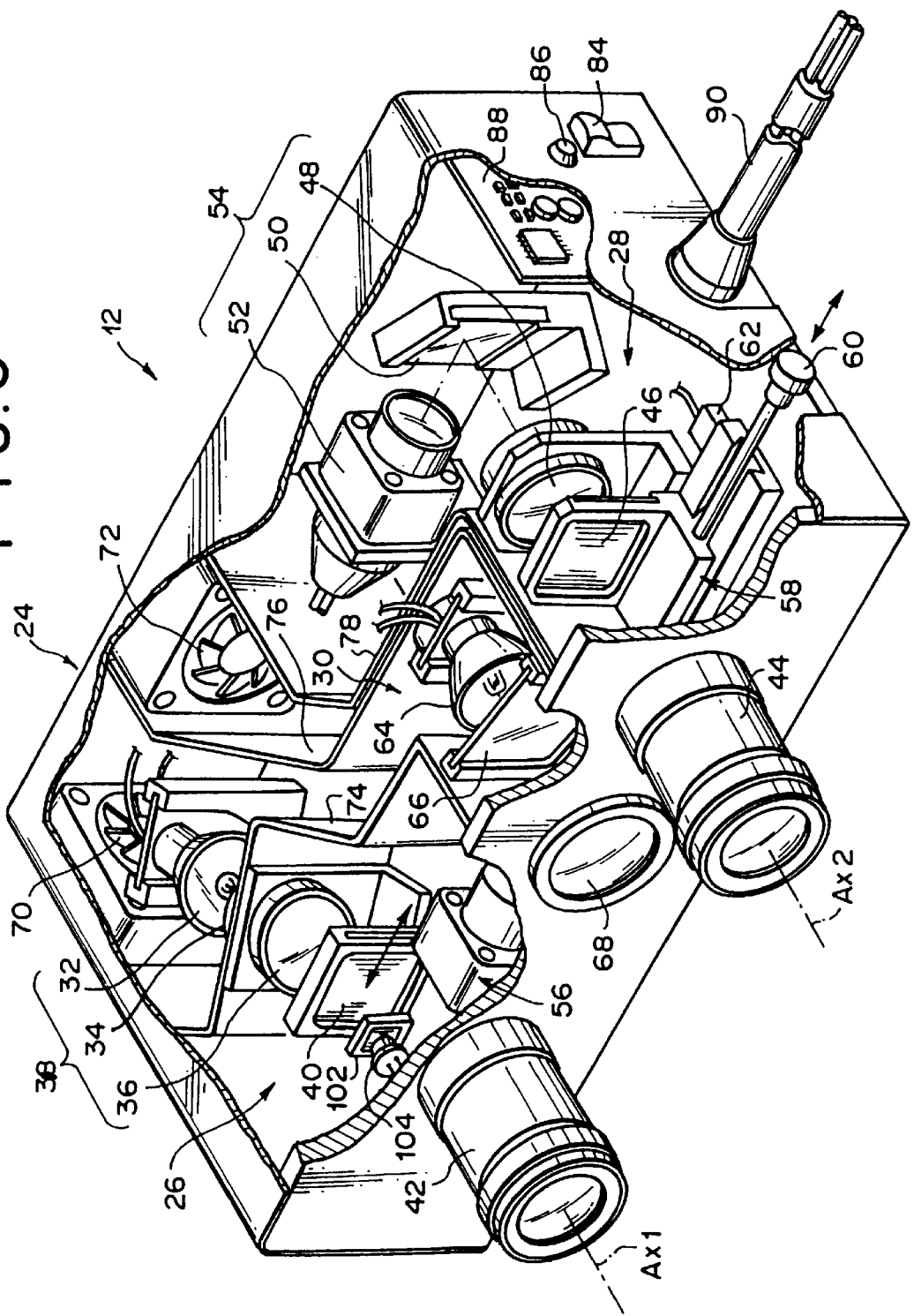
FIG. 3 is a perspective view showing the interior configuration of the measurement head shown in FIG. 1.

FIG. 2 is a perspective view showing the exterior of the measurement head 12, whereas FIG. 3 is a perspective view showing the interior configuration of the measurement head 12.

As shown in these drawings, the measurement head 12 comprises a casing 24; and a projection optical system 26, an observation optical system 28, and an object illumination system 30 which are disposed within the casing 24.

The projection optical system 26 comprises a grating illumination system 38 constituted by a projection lamp 32, a heat-ray cutoff filter 34, and a condenser lens 36; a projection grating 40; and a projection lens 42. On the other hand, the observation optical system 28 comprises a taking lens 44; an observation reference grating 46; and a TV optical system 54 constituted by a field lens 48, a bending mirror 50, and a CCD camera 52.

The projection lens 42 and the taking lens 44 are attached to the front face of the casing 24 such that their respective optical axes Ax1 and Ax2 are parallel to each other.

The grating illumination system 38 is disposed so as to illuminate the projection grating 40 from obliquely leftward therebehind with respect to the optical axis Ax1. The image of the projection lamp 32 is substantially focused at the entrance pupil position of the projection lens 42. The condenser lens 36 has such dimensions as to fully cover the projection grating 40.

On the other hand, the observation reference grating 46 and the field lens 48 and bending mirror 50 of the TV optical system 54 are disposed on the optical axis Ax2, whereas the CCD camera 52 is disposed on the optical axis bent at right angles to the optical axis Ax2 by the bending mirror 50. The field lens 48 is disposed such that all the luminous flux transmitted through the observation reference grating 46 is made incident on the CCD camera 52.

The projection grating 40 and the observation reference grating 46 have vertically extending grating lines with pitches identical to each other, and are disposed within the same plane orthogonal to the optical axes Ax1 and Ax2. The projection grating 40 is placed at a position conjugate with the virtual reference grating plane Pg (see FIG. 1) so that an image of the projection grating 40 is focused onto the virtual reference grating plane Pg. On the other hand, the observation reference grating 46 is placed at a position conjugate with the virtual reference grating plane Pg so that an image of the virtual reference grating plane Pg is focused onto the observation reference grating 46.

Figure 4:
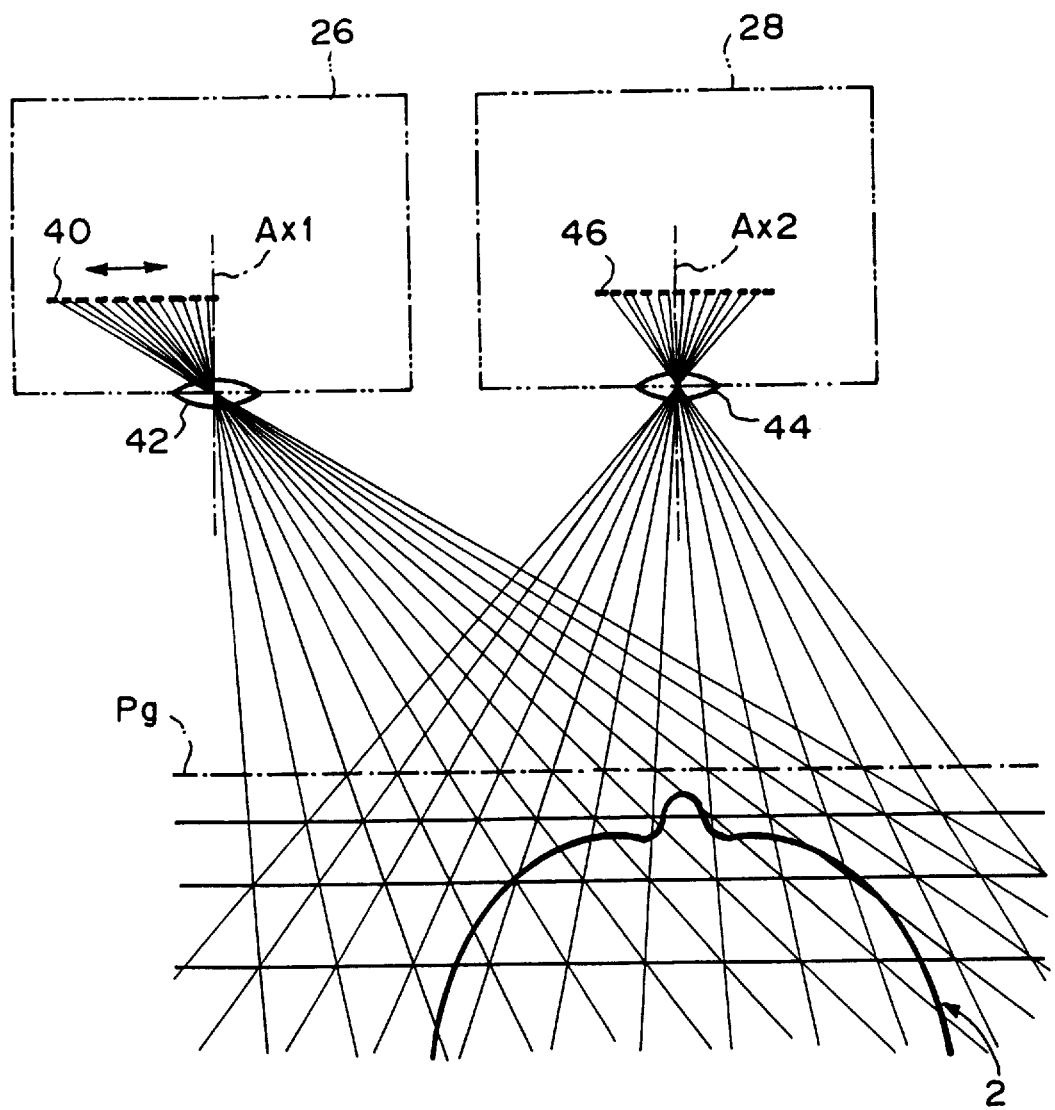
FIG. 4 is a plan view for explaining functions of the measurement head shown in FIG. 1.

FIG. 4 is a plan view for explaining functions of the measurement head 12 as the grating projection type moire apparatus.

As depicted, the measurement head 12 is configured such that an image of the projection grating 40 is projected by the projection optical system 26 onto the object to be measured 2, a deformed grating image formed on the object 2 is focused onto the observation reference grating 46 by the observation optical system 28, and the resulting moire fringe is observed.

In FIG. 4, the virtual reference grating plane Pg indicated by a dash-single-dot line and a plurality of planes indicated by solid lines parallel to the virtual reference grating plane Pg form moire planes, and a moire fringe is formed along a curve at which the individual moire planes intersect the object to be measured 2. Though FIG. 4 shows the moire planes only in front of the virtual reference grating plane Pg by solid lines, a plurality of moire planes are also formed behind the virtual reference grating plane Pg. As a consequence, a moire fringe is also formed when the object 2 is disposed across the reference grating plane Pg.

As shown in FIG. 3, the projection grating 40 is supported by a grating feeding mechanism 56, so as to be movable thereby to-and-fro horizontally (i.e., in directions orthogonal to the grating lines of the projection grating 40) within a plane orthogonal to the optical axis Ax1. The grating feeding mechanism 56 is constituted by a pulse stage equipped with a pulse motor, so as to vibrate (fringe-scan) the projection grating 40 to-and-fro for a length of one phase. In place of the pulse stage, a piezoelectric device or the like may be used for effecting the to-and-fro vibration.

As the projection grating 40 moves, the phase between the projection grating 40 and the observation reference grating 46 changes, whereby the moire fringe changes along therewith. Therefore, the moire fringe image is sampled by the control section 16 (see FIG. 1) at every ¼ phase, so as to determine whether the object 2 is protruded or depressed.

On the other hand, the observation reference grating 46 is supported by a grating retracting mechanism 58, so as to be movable thereby horizontally within a plane orthogonal to the optical axis Ax2, whereby the observation reference grating 46 can selectively attain a moire fringe observation position located within the optical path of the observation optical system 28 and a retracted position outside the optical path. The movement of the observation reference grating 46 is effected by manually pushing or pulling a grating retracting knob 60 projecting from the right side face of the casing 24 in the grating retracting mechanism 58. Attached to the grating retracting mechanism 58 is a limit switch 62 which detects the observation reference grating 46 when it is moved to the retracted position.

While the moire fringe observation for capturing the three-dimensional form information of the object to be measured 2 is carried out in a state where the observation position, a two-dimensional image of the object 2 without formation of a moire fringe can be taken when the observation reference grating 46 is retracted to the retracted position. Therefore, the measurement head 12 captures the pattern information of the object 2 by taking this two-dimensional image.

As shown in FIG. 3, the object illumination system 30 is positioned between the projection optical system 26 and the observation optical system 28. The object illuminating system 30 comprises an illumination lamp 64, a heat-ray cutoff filter 66, and a diffuser window 68 attached to the front face of the casing 24; and is configured so as to diffuse and radiate the light from the illumination lamp 64 forward through the heat-ray cutoff filter 66 and the diffuser window 68.

The illumination lamp 64 is in its unlit state at the time of moire fringe observation, and is lit when taking a two-dimensional image. In synchronization with this lighting action, the projection lamp 32 in the grating illumination system 38 is turned off. This switching of lighting is carried out according to the detection signal of the limit switch 62.

The switching from the projection lamp 32 to the illumination lamp 64 is thus effected at the time of taking a two-dimensional image, in order to prevent the two-dimensional image of the object 2 from being taken in the state where the image of the projection grating 40 is formed, which occurs when the two-dimensional image is taken in the state where the projection lamp 32 is kept turned on without lighting the illumination lamp 64. When the illumination lamp 64 is turned on, the influence of the image of the projection grating 40 becomes very small even if the projection lamp 32 is kept turned on. As a consequence, it is not always necessary to turn off the projection lamp 32 in synchronization with the lighting of the illumination lamp 64.

Cooling fans 70 and 72 are attached to the left side face and the back face of the casing 24, respectively, so as to discharge the heat generated by the projection lamp 32 and illumination lamp 64 to the outside of the casing 24. Here, partitions 74 and 76 formed within the casing 24 efficiently guide the heat generated by both lamps 32 and 64 to the cooling fan 70. Further, another partition 78 is formed between the CCD camera 52 and the partition 76 so as to form a thermally insulated path, such that the air (heat) within the thermally insulated path is guided to the cooling fan 72. Thus, the heat generated by both lamps 32 and 64 is reliably prevented from being transmitted to the CCD camera 52, whereby the latter is protected.

As shown in FIG. 2, cooling air inlets 80 and 82 are formed at the parts above the lamps 32 and 64, respectively, so as to enhance the heat discharging efficiency of the cooling fans 70 and 72.

The right side face of the casing 24 is provided with a power switch 84 and a power indicator lamp 86 in addition to the grating retracting knob 60, whereas an electronic board 88 is disposed on the inner side thereof. Also extending from the right side face of the casing 24 is a power and signal cord 90, which is connected, at the other end portion, to the power equipment driving section 14 (see FIG. 1) via a power connector 92, a control signal connector 94, and a TV signal connector 96.

Since the moire fringe appearing on the monitor 18 is captured by way of the observation optical system 28 of the measurement head 12, the actual depth of the moire fringe formed at a position near the taking lens 44 of the observation optical system 28 on the object to be measured 2 differs from that of the moire fringe formed at a position far from the taking lens 44, even when they have the same grating line interval. As a consequence, for obtaining correct three-dimensional form information of the object 2, it is necessary to correct the image magnification according to the position of each point on the object 2 in the depth direction.

Therefore, in this embodiment, at the time of observing the moire fringe, the distance between an apex of the object 2 and the taking lens 44 is automatically measured, and the image magnification correction of each point on the object 2 is corrected according to thus measured distance data. Here, the point on the object 2 subjected to distance measurement is also a reference point for image magnification correction. Consequently, it is necessary to correctly grasp its position within a plane (xy plane) orthogonal to the depth direction (z direction).

Hence, this embodiment is configured such that an apex of the object 2 is selected as a distance-measuring reference point on the object 2 and is displayed with a flag on the monitor 18.

FIG. 5 is a flowchart showing a procedure of apex selection, distance measurement, and image magnification correction, which is carried out at the time of moire fringe observation.

First, an apex is selected by moire fringe measurement (S1). Namely, a moire fringe image is captured while performing fringe scanning, the moire fringe is analyzed in terms of fringe, a height is calculated with internally set values, three-dimensional data (x, y, z) of each point on the object 2 is computed, and then the apex is selected from the three-dimensional data. Thereafter, thus selected apex is displayed with a flag on the monitor 18 (S2). When an operator confirms the apex position displayed with the flag and inputs "OK"(S3), then the distance between the apex and the taking lens 44 is automatically measured (S4). Thereafter, thus measured distance value is automatically inputted (S5), an expression for calculating the height is operated (S6), and then the image magnification of each point on the object 2 is corrected according to the result of operation (S7).

FIGS. 6A to 6C are views showing a specific procedure of selecting an apex in the moire fringe measurement in step S1.

First, images of the object to be measured 2 whose phases are shifted from each other by $1/2\ \pi$ are captured. Here, when the brightness I of one point P (x, y) in each of thus captured images is taken into consideration, it can be denoted as I1, I2, I3, and I4 in the respective images as shown in FIG. 6A.

From these four kinds of brightness data having phases different from each other, the phase φ of this point is determined as:

$$\phi = \tan^{-1}\left[(I2-I4)/(I1-I3)\right]$$

This φ is calculated for each point, and plotting the results of phase calculation yields a graph of FIG. 6B. The maximum value in this graph is 2 φ, and the graph becomes a curve interrupted at intervals of 2 φ.

When this intermittent curve is subjected to unwrapping processing so as to phase-connect the curve, a curve shown in FIG. 6C is obtained. It can yield the height z of each point in the image (the relative depth of each point of the object 2) when the height per fringe of the moire fringe is set to δ(δ=2 φ), whereby the apex of the object 2 can be found.

Namely, comparison/selection is effected throughout the measuring area such that if $$z1(x1,y1)-z2(x2,y2) \geq 0 \text{ (or } >0)$$

then P (x1, y1, z1) is selected, and if $$z1(x1,y1)-z2(x2,y2) < 0 \text{ (or } \leq 0)$$

then P (x2, y2, z2) is selected, whereby the apex P (X, Y, Z) is selected. Here, any point of a plurality of selected points may be chosen if the equal sign holds true in any of the above expressions.

Since items of a frame memory and CCD pixels correspond to each other in a one-to-one relationship, the coordinates in the frame memory and the coordinates on the monitor coincide with each other.

Figure 7A:
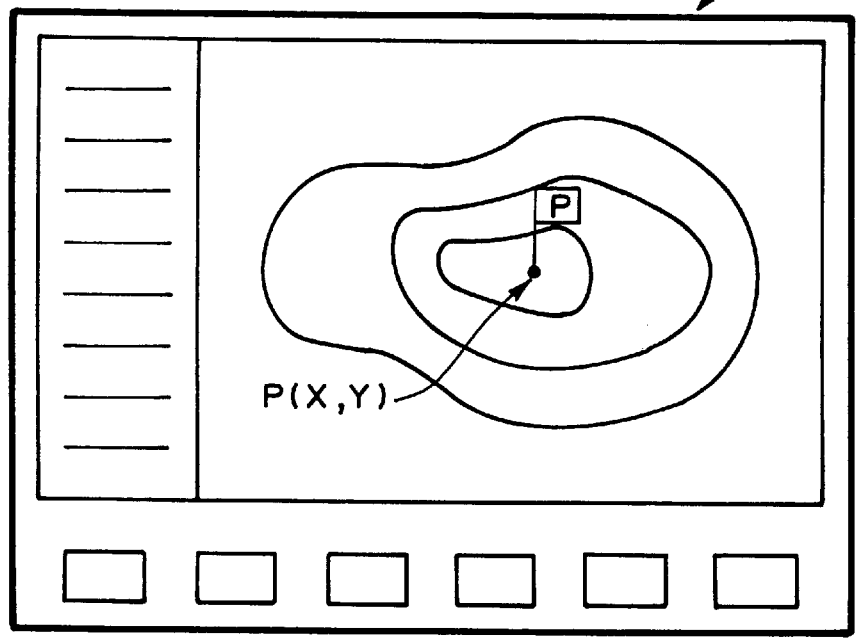
FIGS. 7A and 7B are schematic views showing states where a selected apex is displayed with a flag on a monitor.
Figure 7B:
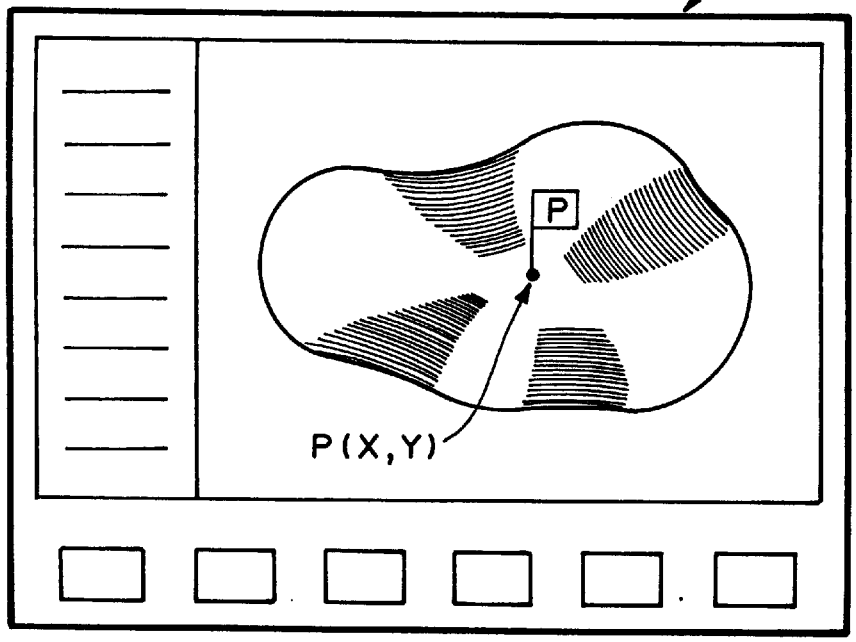

FIGS. 7A and 7B are views showing states where the xy-coordinate value P (X, Y) of the selected apex P (X, Y, Z) is displayed with a flag on the monitor 18. FIG. 7A shows an example in which the flag is displayed on a chart (e.g., a contour map) showing the results of moire fringe analysis, whereas FIG. 7B shows an example in which the flag is displayed on a video-through image. When the charts displayed with the flag in these two modes are displayed on the monitor 18 in a switchable fashion, then whether the apex P (X, Y, Z) is appropriately selected or not can visually be inspected in a reliable manner.

FIG. 8 is a view for explaining a method of automatically measuring the distance between the apex P (X, Y, Z) and the taking lens 44.

This automatic measurement is carried out by means of a general autofocus technique.

First, upon the automatic measurement, the observation reference grating 46 is retracted to a retracted position.

Then, after it is confirmed that a lens 52L of the CCD camera 52 is located at its home position, i.e., reference setting (1 m) is made, the video signal of the flag-displayed pixel is observed.

Subsequently, with the lens 52L being moved along its optical axis, a peak is detected by a hill-climbing method. Then, from the amount of movement ε of the lens 52L at the time of detecting this peak, the amount of displacement ΔL of the point on the object side in the depth direction corresponding to the amount of movement ε is computed. Subtracting the amount of displacement ΔL from the distance L between the point on the object side when the lens 52L is located at the home position and the principal point (object-side principal point) H of the taking lens 44 yields the distance L' between the apex P (X, Y, Z) of the object and (the principal point H of) the taking lens (L'=L−ΔL).

Figure 9A:
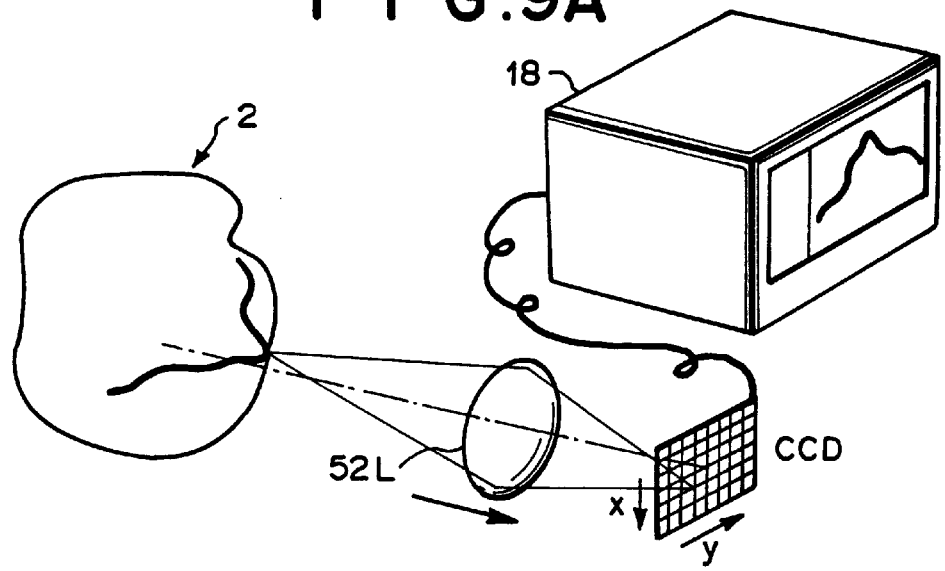
FIGS. 9A to 9C are schematic views showing a procedure of detecting a peak by a hill-climbing method.
Figure 9B:
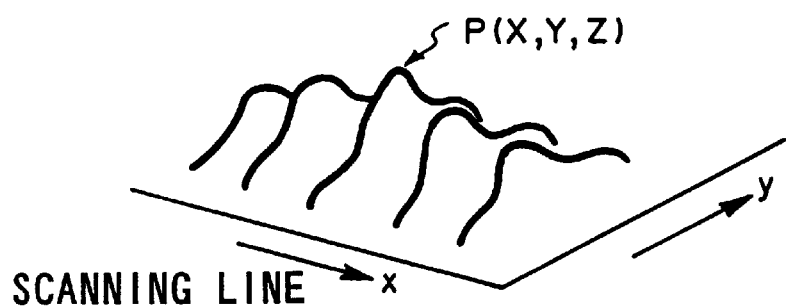
Figure 9C:
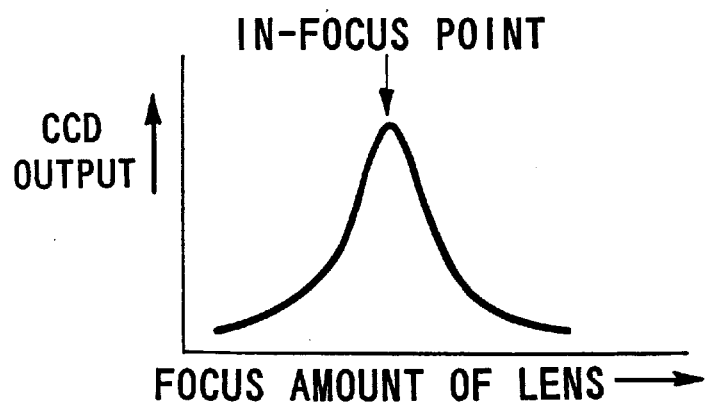

The peak detection by the hill-climbing method is carried out by the procedure shown in FIGS. 9A to 9C.

Namely, the lens 52L of the CCD camera 52 is moved along its optical axis as shown in FIG. 9A, and the image at each of thus moved position is captured as shown in FIG. 9B. At this time, as shown in FIG. 9C, the video signal output of the flag-displayed pixel is plotted on a graph, and the lens position at which the output is maximized (i.e., the in-focus position) is determined as the peak detection position.

Figure 10A:
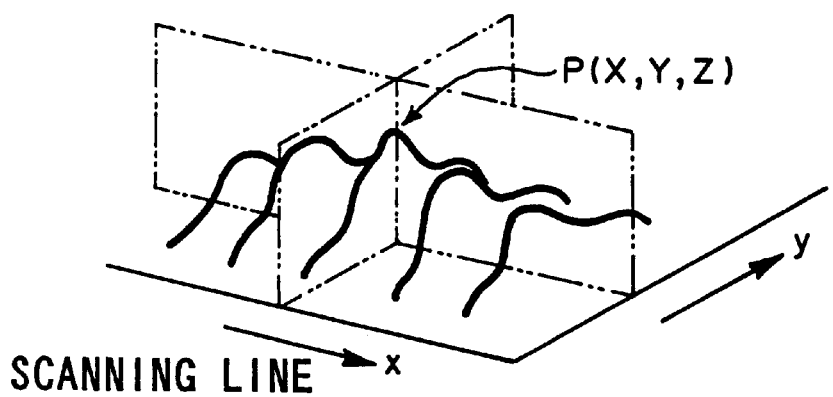
FIGS. 10A to 10C are schematic views showing a procedure of verifying a peak detection position.
Figure 10B:
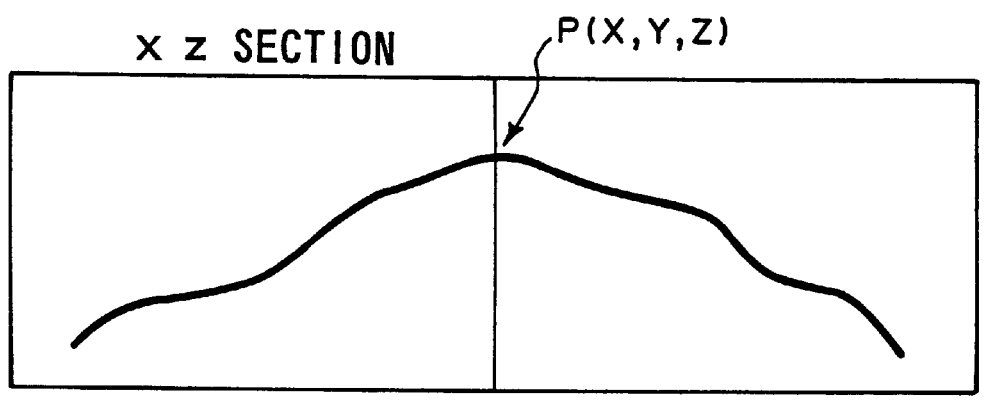
Figure 10C:
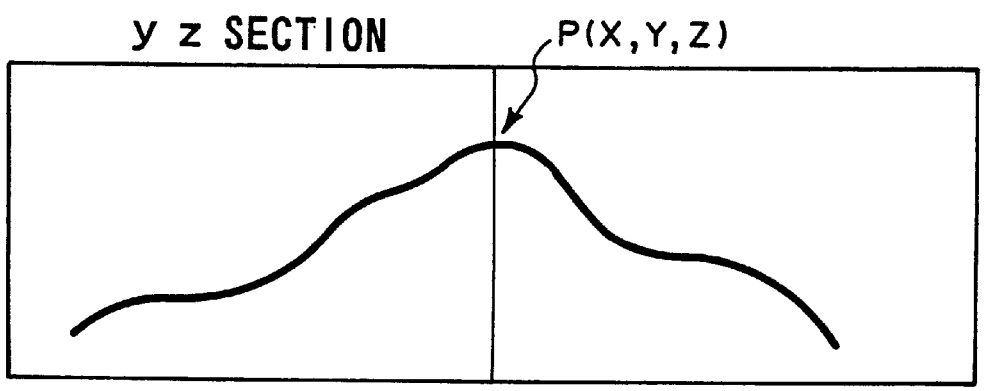

Here, if the sections in x-axis direction and y-axis direction including the apex P (X, Y, Z) at the peak detection position are taken as shown in FIG. 10A, and the output values of the individual pixels in x-axis direction and y-axis direction including the flag-displayed pixel are plotted on graphs as shown in FIGS. 10B and 10C, whether or not the apex P (X, Y, Z) attains the peak value at the peak detection position can be verified. For computing the amount of displacement ΔL of the object-side point, the following relational expressions are employed.

Namely, in FIG. 8, the amount of displacement Δb of the imaging point formed by the taking lens 44 when the object-side point is displaced by ΔL is:

$$\Delta b = [f/(f-L)]^2 \Delta L$$

where the focal length of the taking lens 44 is f. Then, its accompanying amount of movement ε of the lens 52L in the CCD camera 52 is:

$$\epsilon = [f'/(f'-L)]^2 \Delta b$$

where the focal length of the lens 52L is f'. Consequently, from these two expressions, $$\Delta L = [(f'-L)(f-L)/ff']^2 \epsilon$$

is obtained.

A modified example of this embodiment will now be explained.

Though the above-mentioned embodiment relates to a case where the automatic measurement of the distance between the apex P (X, Y, Z) and the taking lens 44 is effected by a typical autofocus technique, the automatic measurement may be carried out by other measuring methods as well.

Figure 11:
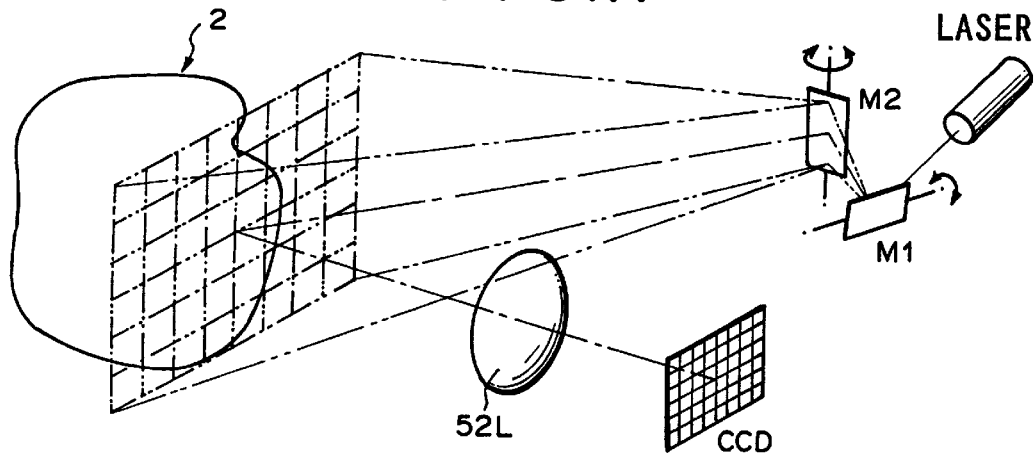
FIG. 11 is a perspective view for explaining a modified example of the automatic measuring method shown in FIG. 8.

For example, a scanning optical system shown in FIG. 11 may be used for effecting the automatic measurement.

Namely, a beam from a laser is pivoted by a mirror M1 about a horizontal axis so as to be vertically deflected and reflected, and thus deflected and reflected beam is made incident on a mirror M2 which is pivoted about a vertical axis so as to be horizontally deflected and reflected. Thus vertically and horizontally scanned beam irradiates the object to be measured 2. By reading out the pivoting angle θ of the mirror M2 at the time when the beam reflected by the surface of the object 2 is made incident on the flag-displayed pixel of the CCD, the distance d between the apex P (X, Y, Z) and the lens 52L in the optical axis direction can be computed.

Figure 12:
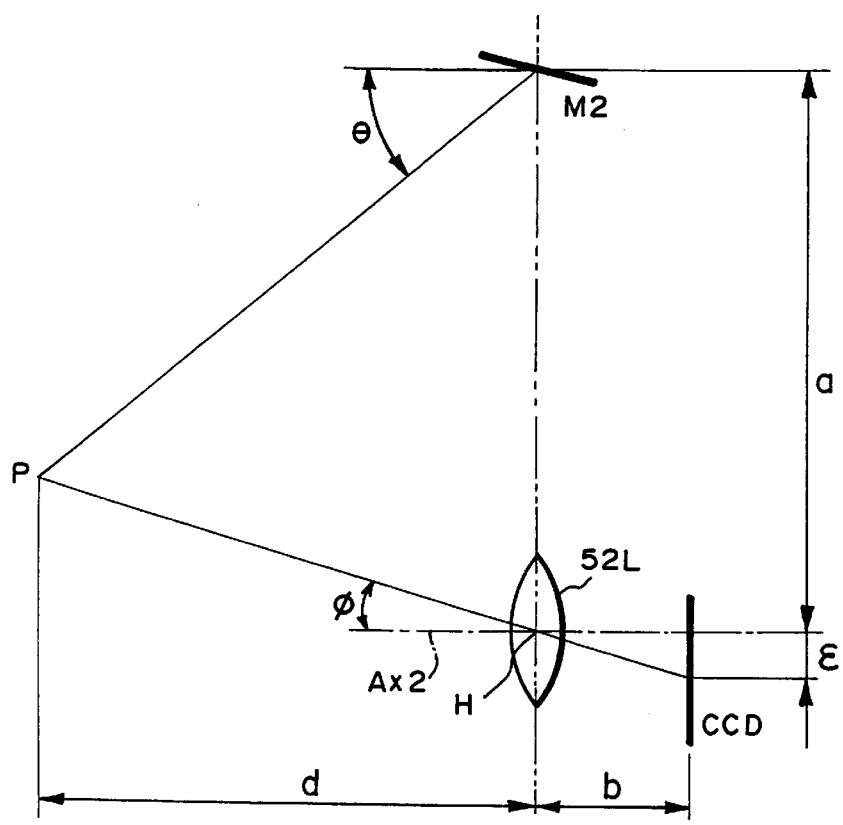
FIG. 12 is a plan view for explaining a method of computing the distance between an apex and a taking lens of an observation optical system in the modified example shown in FIG. 11.

FIG. 12 is a plan view for explaining the method of computing the distance d.

Suppose the case where the pivotal axis of the mirror M2 is located on the principal plane of the lens 52L in this drawing. Then, the distance a between the pivotal axis of the mirror M2 and the optical axis Ax2 of the lens 52L is:

$$a = d(\tan \theta + \tan \phi)$$

Here, the angle φ is the horizontal component of the angle formed between the optical axis Ax2 and the line connecting the apex P (X, Y, Z) and the flag-displayed pixel, and is expressed by:

$$\tan \theta = \epsilon/b$$

where ε is the y-coordinate value of the flag-displayed pixel, and b is the distance between the CCD and the principal plane of the lens 52L.

From the above two expressions, $$d = a/(\tan \theta + \epsilon/b)$$

is obtained. Consequently, when the pivoting angle θ of the mirror M2 is read out, the distance d between the apex P (X, Y, Z) and the lens 52L in the optical axis direction can be computed.

Here, the pivoting angle θ of the mirror M2 can be read out by a method comprising the steps of generating a pulse upon pivoting the mirror M2 and detecting the amount of an encoder caused by the pivoting of the mirror M2.

Figure 13:
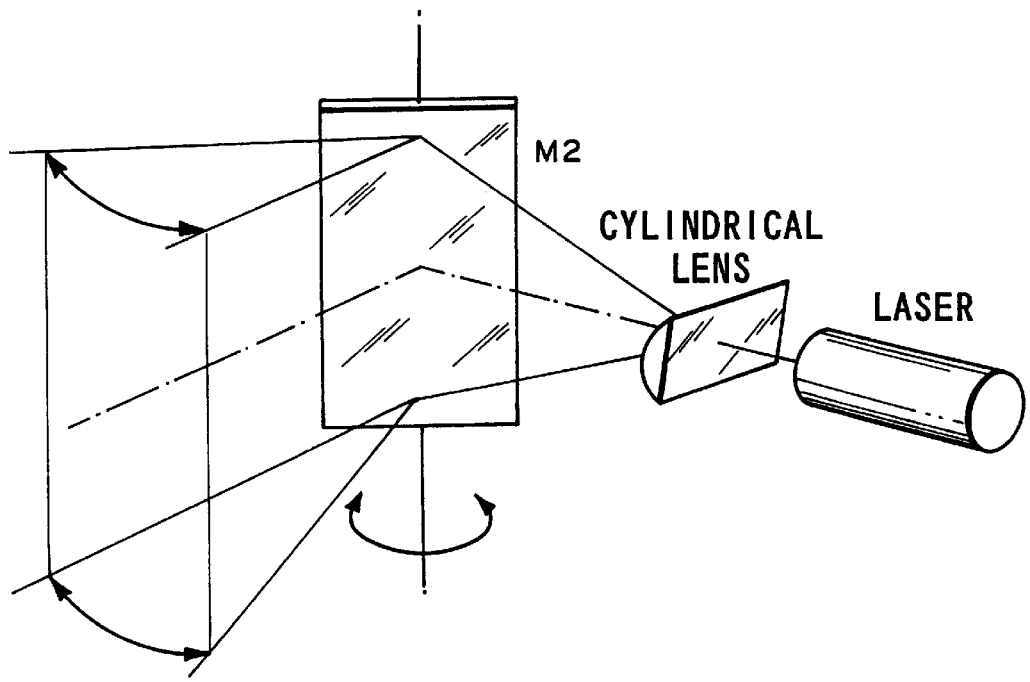
FIG. 13 is a perspective view showing a partly modified example of the configuration shown in FIG. 11.

In place of the mirror M1 in FIG. 11, a horizontally extending cylindrical lens such as that shown in FIG. 13 may be used. When a cylindrical lens is used as such, a vertically diffusing beam can be made incident on the mirror M2, whereby the mirror M1 and the driving means for pivoting the mirror M1 about a horizontal axis can be eliminated. Though not a beam spot but a vertically extending beam line is made incident on the CCD in this case, it does not at all affect the calculation of the distance d by reading out the pivoting angle θ of the mirror M2.

While the above-mentioned embodiment is configured such that the selected apex P (X, Y, Z) is displayed with a flag on the monitor 18, and the distance between the apex P (X, Y, Z) and the taking lens 44 is automatically measured on condition that the operator confirms thus flag-displayed apex position and inputs "OK"; the automatic measurement may be effected in synchronization with the apex selection waiting for the input of "OK." Also, the flag display onto the selected apex P (X, Y, Z) may be omitted.

Though the above-mentioned embodiment relates to the case where the distance between the apex P (X, Y, Z) and the taking lens 44 is automatically measured, it may be measured manually with a measure or the like. In this case, since the flag display of the apex P (X, Y, Z) is effected in both of the image displaying the results of the moire fringe analysis and the video-through image, whether the apex P (X, Y, Z) is appropriately selected or not can visually be confirmed in a reliable manner.

Meanwhile, in FIG. 3, a stationary grating 102 is disposed at a position near the projection grating 40 on the projection lens 42 side, and a photocell 104 is disposed at a position near the stationary grating 102 on the projection lens 42 side. The stationary grating 102 and the photocell 104 are secured to the casing 24.

Figure 14:
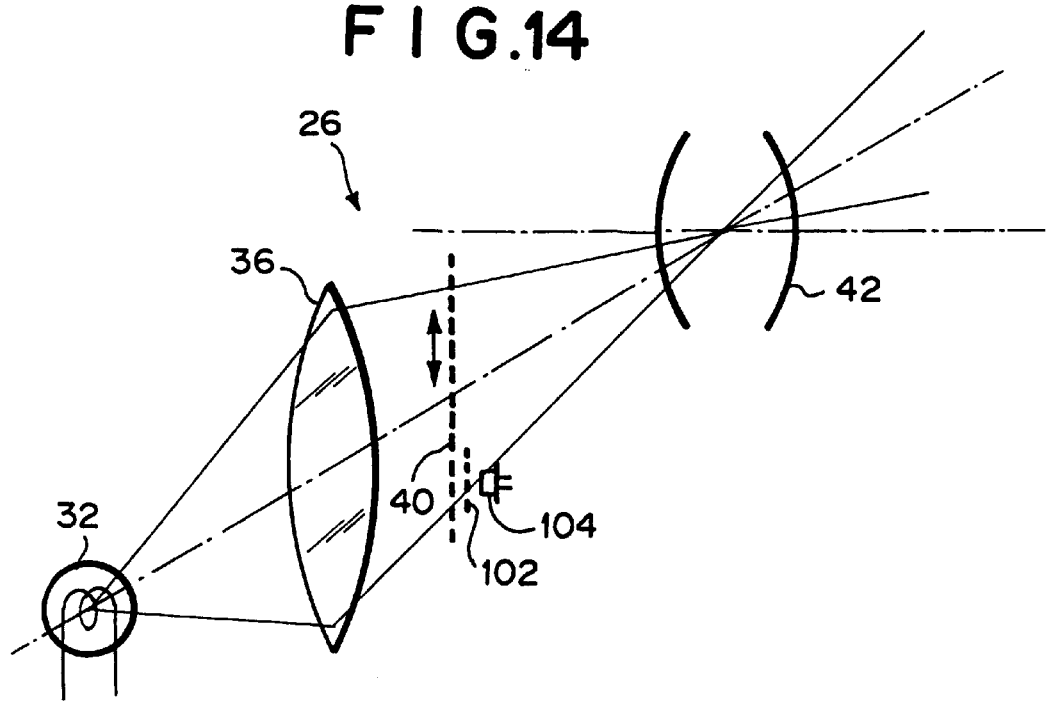
FIG. 14 is a plan view showing the arrangement of the stationary grating and photocell in the moire apparatus shown in FIG. 3.
Figure 15:
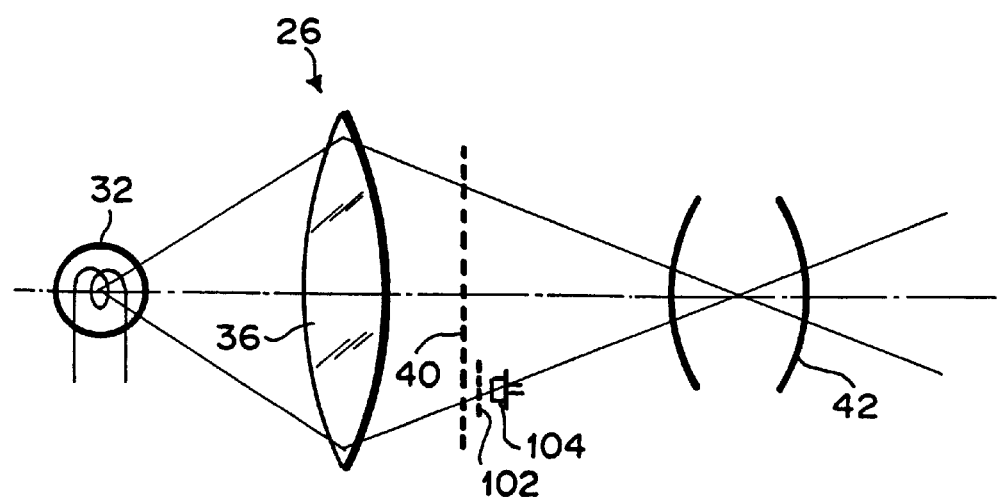
FIG. 15 is a side view showing the arrangement of the stationary grating and photocell shown in FIG. 3.

FIGS. 14 and 15 are plan and side views, respectively, showing the arrangement of the stationary grating 102 and photocell 104.

As shown in these drawings, the stationary grating 102 is disposed at a peripheral portion of the luminous flux positioned on the left side below the principal ray of the projection optical system 26. Here, the stationary grating 102 is disposed such that its grating lines have a pitch identical to that of the grating lines of the projection grating 40, while forming a slight angle of intersection (e.g., 5°) therebetween, thereby forming a moire fringe such as that shown in FIG. 16 with the projection grating 40. Here, the stationary grating 102 is disposed within the optical path of the projection optical system 26 in order to utilize the light from the projection lamp 32 as backlight. Also, it is disposed at the peripheral portion of the luminous flux so as not to affect the aimed moire fringe analysis of the moire apparatus 12. Hence, it is not necessary for the stationary grating 102 to be placed on the left side below the principal ray as depicted, as long as it is located at a peripheral portion of the luminous flux.

Figure 16:
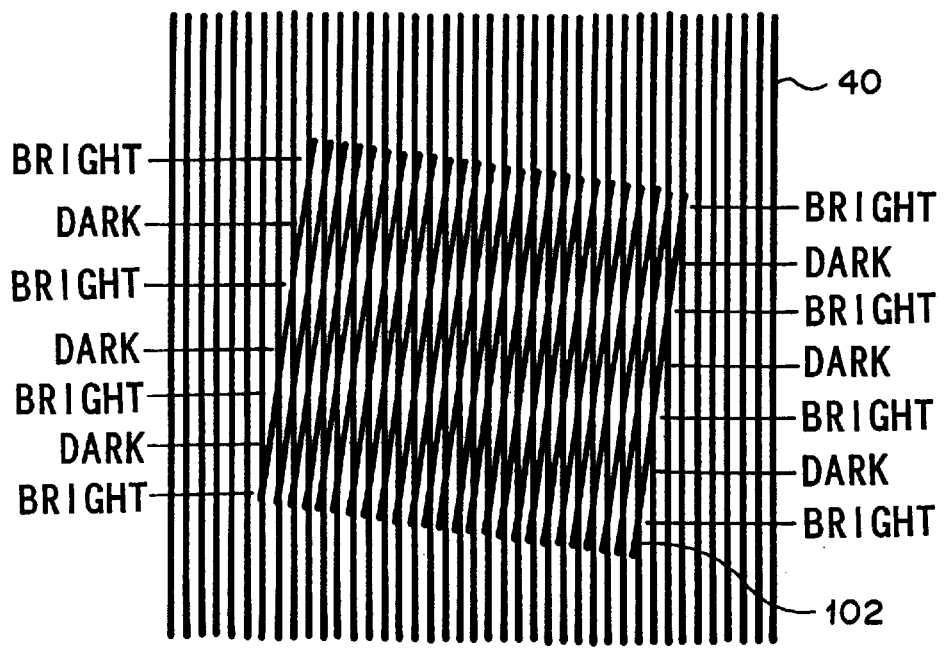
FIG. 16 is a view showing a moire fringe formed by the projection grating and stationary grating in the moire apparatus shown in FIG. 1.
Figure 17:
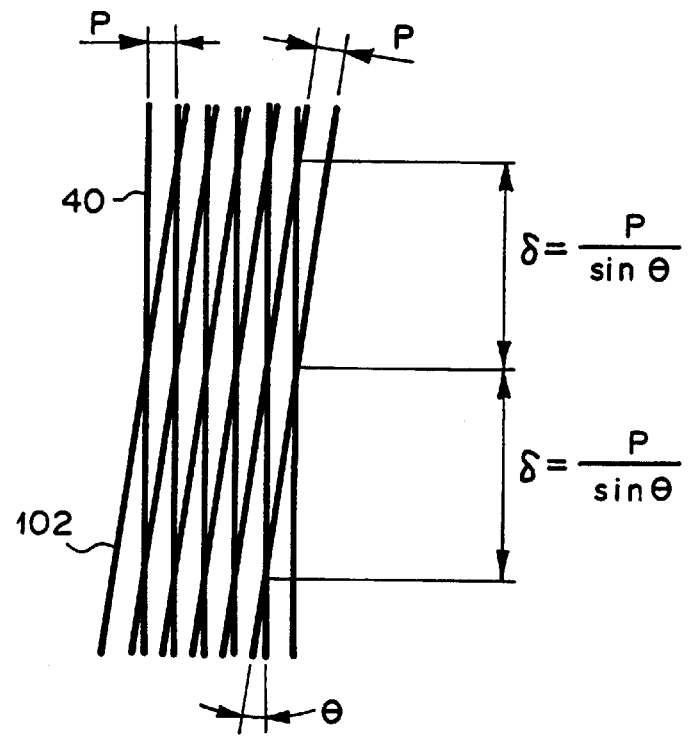
FIG. 17 is an enlarged view of the moire fringe shown in FIG. 16.

As shown in FIG. 16, the moire fringe formed by the projection grating 40 and the stationary grating 102 comprises a plurality of nearly vertically stacked stages of bright and dark fringes. As shown in FIG. 17, the pitch δ of this moire fringe is expressed by:

$$\delta = P/[2 \sin(\theta/2) \cdot \cos(\theta/2)] = P/\sin\theta$$

where the pitch of the projection grating 40 and stationary grating 102 is P, and the angle of intersection between the projection grating 40 and the stationary grating 102 is θ.

Then, as shown in FIG. 18, the illuminance of the moire fringe is detected by the photocell 104 disposed near the stationary grating 102. The photocell 104 is disposed near the stationary grating 102 so as to detect the illuminance without crossing a plurality of moire fringes, thereby enhancing its accuracy of detection. Since the illuminance detected by the photocell 104 varies depending on the positional relationship between the projection grating 40 and the stationary grating 102, the amount of movement of the projection grating 40 can be detected by thus detected illuminance.

FIG. 19 is a graph showing the relationship between the amount of movement of the projection grating 40 and the illuminance (I) detected by the photocell 104.

As depicted, the detected illuminance (I) becomes the maximum illuminance Imax when the projection grating 40 attains the phase identical to that of the stationary grating 102, whereas it linearly decreases as the phase shifts. When the phase shifts by half a pitch (P/2), the detected illuminance (I) becomes the minimum illuminance Imin. Thereafter, the detected illuminance (I) linearly increases as the phase further shifts. The detected illuminance (I) resumes the maximum illuminance Imax when the phase shifts by one pitch (P).

Therefore, the amount of movement of the projection grating 40 can be computed according to the illuminance (I) detected by the photocell 104. The amount of movement is computed by the control section 16, and thus computed value is utilized not only as a feedback signal at the time of the pulse motor driving control of the grating feeding mechanism 56 but also as the phase of the calculating expression at the time of moire analysis in the moire apparatus 12.

This configuration can enhance the fringe scanning accuracy, thereby improving the accuracy in moire fringe analysis.

When the viewing area of the photocell 104 is so large, the average dynamic range of the brightness distribution in this area decreases, thereby deteriorating the brightness resolution. For this reason, the photocell 104 is disposed near the stationary grating 102. Such a close arrangement, however, is not always easy in terms of construction.

As shown in FIG. 20, when a lens 106 is disposed between the stationary grating 102 and the photocell 104 such that they have a conjugate positional relationship therebetween, the illuminance of a single point can be detected, whereby the brightness resolution can be enhanced.

Figure 22:
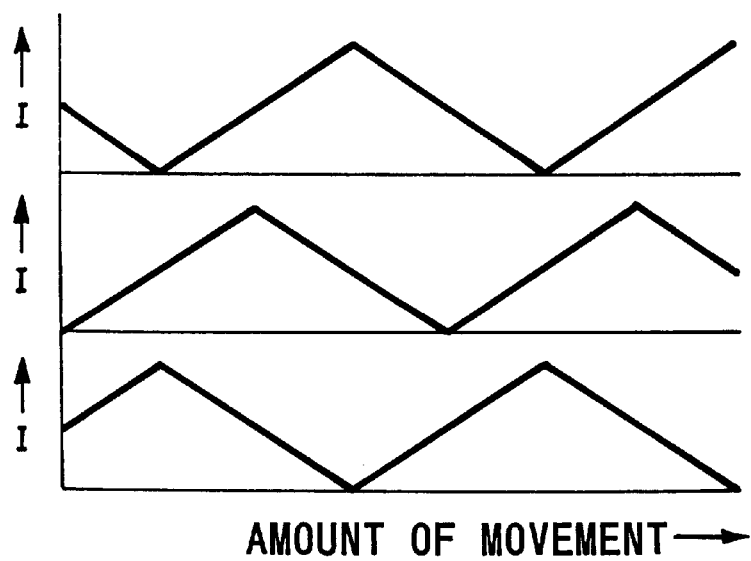
FIG. 22 is a graph showing an operation of the second modified example shown in FIG. 21.

Also, in this case, when a plurality of photocells 104 are disposed in parallel so as to align vertically as shown in FIG. 21, the results of illuminance detection obtained by the individual photocells can be used, whereby the brightness resolution can further be enhanced. Here, as shown in FIG. 22, when the individual photocells 104 are arranged such that the illuminance is not detected at the same phase, the moving direction of the projection grating 40 can also be determined according to their respective results of illuminance detection. Also, instead of thus arranging a plurality of photocells 104, a line sensor using CCDs and the like may be provided.

Figure 23:
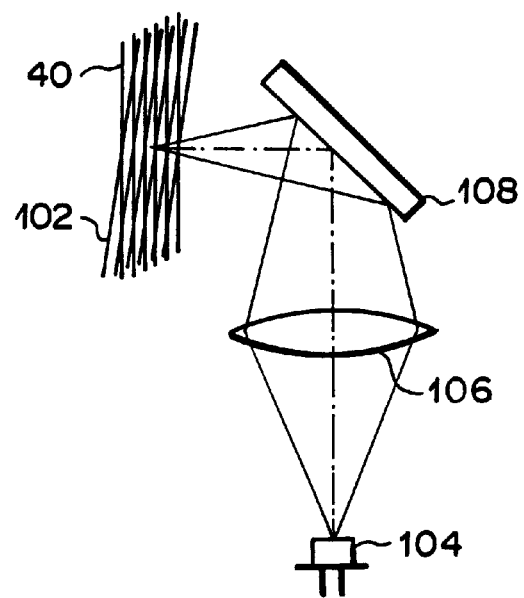
FIG. 23 is a view, similar to FIG. 18, showing a third modified example of the moire apparatus shown in FIG. 1.

Further, in place of the configuration shown in FIG. 20, if a mirror 108 is disposed between the stationary grating 102 and the lens 106 as shown in FIG. 23, the degree of freedom in arrangement of the lens 106 and photocell 104 can be enhanced.

Figure 24:
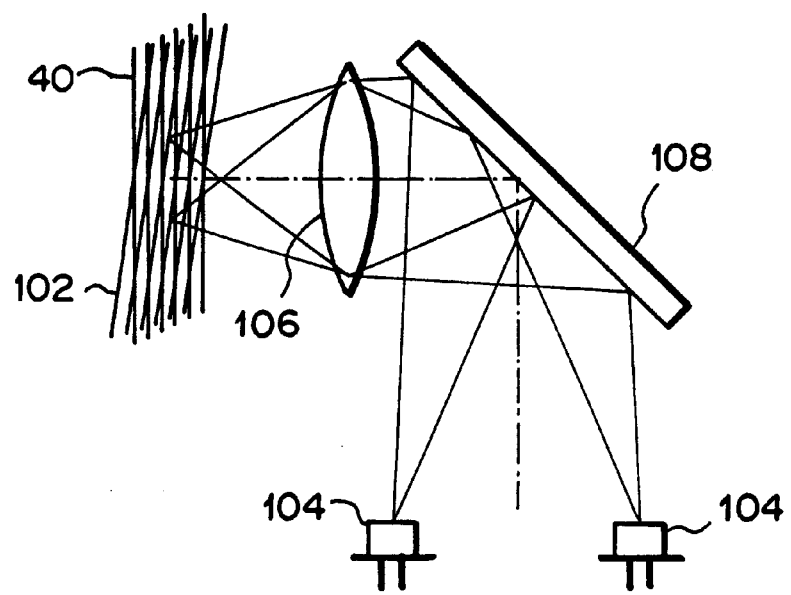
FIG. 24 is a view, similar to FIG. 18, showing a fourth modified example of the moire apparatus shown in FIG. 1.

Also, as shown in FIG. 24, when a mirror 108 is disposed between the lens 106 and the photocell 104, and a plurality of photocells 104 are arranged so as to form a predetermined angle with respect to the optical axis of the mirror 108, the brightness resolution can be enhanced, and the moving direction of the projection grating 40 can be determined.

Figure 25:
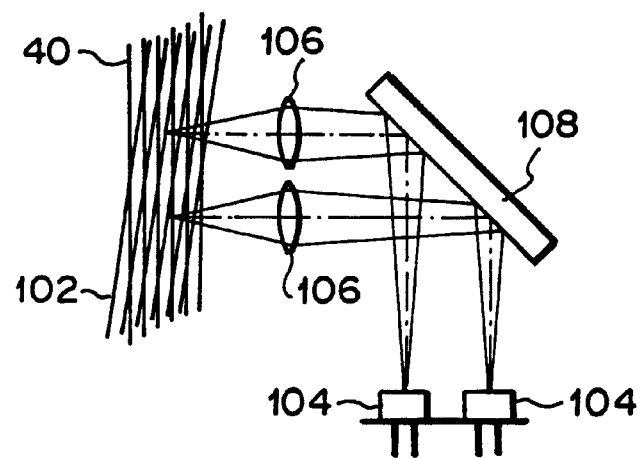
FIG. 25 is a view, similar to FIG. 18, showing a fifth modified example of the moire apparatus shown in FIG. 1.

Further, in this case, similar operations and effects can be obtained also when a plurality of sets of lenses 106 and photocells 104 are arranged as shown in FIG. 25.

Though the above-mentioned embodiment is configured such that the light from the projection lamp 32 is utilized as the backlight for irradiating the stationary grating 102, a light source different from the projection lamp 32 may be used as well. In this case, when a monochromatic filter is inserted such that the stationary grating 102 is irradiated with light in a wavelength region to which the observation optical system 28 has no sensitivity, the projection grating 40 can be prevented from partly becoming brighter than the rest. Similar operations and effects can also be obtained when a light source emitting a single wavelength of light such as LED or LD is used instead of thus inserting a monochromatic filter.

Though the grating lines of the projection grating 40 and stationary grating 42 intersect at a predetermined angle θ in the above-mentioned embodiment, they may be made parallel to each other as well.

The moire apparatus in accordance with the first aspect of the present invention is configured such that the moire fringe is observed while the projection grating is being subjected to fringe scanning, three-dimensional data of the object to be measured is computed from thus obtained result, a distance-measuring reference point on the object is selected from the three-dimensional data, and the distance between the distance-measuring reference point and a taking lens is automatically measured. Consequently, it can measure the distance between the object and the taking lens of the observation optical system correctly and efficiently. As a result, the accuracy in image magnification correction can be enhanced, whereby correct three-dimensional form information of the object can be obtained.

Also, the moire apparatus in accordance with the second aspect of the present invention is configured such that the moire fringe is observed while the projection grating is being subjected to fringe scanning, three-dimensional data of the object to be measured is computed from thus obtained result, a distance-measuring reference point on the object is selected from the three-dimensional data, and the distance-measuring reference point is displayed with a flag on a monitor for observing the moire fringe. Consequently, it can measure the distance between the object and a taking lens of the observation optical system with reference to the flag-displayed point. As a result, the accuracy in image magnification correction and sensitivity correction can be enhanced, whereby correct three-dimensional form information of the object can be obtained.

In these configurations, when an apex of the object to be measured is used as the reference point, the processing for image magnification correction can be made easier.

Further, the moire apparatus in accordance with the third aspect of the present invention is configured such that a stationary grating having a pitch identical to that of a projection grating is disposed at a position near the projection grating, so that both gratings form a moire fringe, and an amount of movement of the projection grating is computed by detecting the change in the moire fringe generated when the projection grating is moved. Consequently, when the driving means for fringe scanning is controlled while the result of computation of the amount of movement is being fed back, the fringe scanning accuracy can be improved. This can improve the accuracy in moire fringe analysis.

What is claimed is:

1. A moire apparatus comprising a projection optical system and an observation optical system which have optical axes parallel to each other, said apparatus being configured such that an image of a projection grating is projected by said projection optical system onto an object is focused by said observation optical system onto an observation reference grating, and a moire fringe formed thereby is observed, said projection grating, and a moire fringe formed thereby is observed, said projection grating being moveable in a direction orthogonal to grating lines of both of said gratings within a plane orthoganal to both of said optical axes;

wherein three-dimensional data of said object is computed from the moire fringe observed while said projection grating is moved and a projection lens of said projection optical system is unmoved, a distance-measuring reference point on said object is selected from said three-dimensional data, and a distance between said distance-measuring reference point and a taking lens of said observation optical system is automatically measured.

2. A moire apparatus according to claim 1, wherein said distance-measuring reference point is an apex of said object.

3. A moire apparatus according to claim 1, wherein said automatic measurement is performed such that a light quantity of reflected light from said object is detected, and a peak is detected according to thus detected light quantity.

4. A moire apparatus according to claim 1, wherein an amount of displacement Δb of an imaging point formed by the taking lens when an object-side point is displaced by ΔL is:

$$\Delta b = [f/(f-L)]^2 \Delta L \quad (1)$$

wherein a focal length of the taking lens is f, wherein an amount of movement ε of a lens in a CCD camera is:

$$\epsilon = [f'/(f'-L)]^2 \Delta b \quad (2)$$

wherein a focal length of the lens in the CCD camera is f', and;

wherein a combination of expressions (1) and (2) above is:

$$\Delta L = [(f'-L)(f-L)/ff']^2 \epsilon \quad (3)$$

5. A moire apparatus comprising a projection optical system and an observation optical system which have optical axes parallel to each other, said apparatus being configured such that an image of a projection grating is projected by said projection optical system onto an object to be measured, a deformed grating image formed on said object is focused by said observation optical system onto an observation reference grating, and a moire fringe formed thereby is observed, said projection grating being movable in a direction orthogonal to grating lines of both of said gratings with a plane orthogonal to both of said optical axes;

wherein three-dimensional data of said object is computed from the moire fringe observed while said projection grating is moved and a projection lens of said projection optical system is unmoved, a distance-measuring reference point on said object is selected from said three-dimensional data and said distance measuring reference point is displayed with a flag on a monitor for observing said moire fringe.

6. A moire apparatus according to claim 5, wherein said distance-measuring reference point is an apex of said object.

7. A moire apparatus according to claim 5, wherein a distance between an apex (P(X, Y, Z)) and a CCD camera lens in the optical axis is computed as follows:

$$a = d(\tan\theta + \tan\phi) \quad (4)$$

wherein $\phi$ is a horizontal component of an angle formed between an optical axis (Ax2) of the CCD camera lens and a line connecting the apex (P(X, Y, Z)) of a flag-displayed pixel, wherein $$\tan\theta = \epsilon/b \quad (5)$$

wherein $\theta$ is a pivoting angle of a mirror (M2), $\epsilon$ is a y-coordinate value of the flag-displayed pixel, and b is a distance from a CCD and a principal plane of the CCD camera lens;

wherein:

$$d = a/(\tan\theta + \epsilon/b) \quad (6)$$

wherein when the angle $\theta$ of the mirror (M2) is read out, the distance d between the apex (P(X, Y, Z)) and the CCD camera lens in the optical axis direction is known.

8. A moire apparatus according to claim 5, wherein said monitor switchably displays results of moire fringe analysis and results of a video-through image.

9. A moire apparatus comprising a projection optical system and an observation optical system which have optical axes parallel to each other, said apparatus being configured such that an image of a projection grating is projected by said projection optical system onto an object to be measured, a deformed grating image formed on said object is focused by said observation optical system onto an observation reference grating and a moire fringe formed thereby is observed, said projection grating being movable in a direction orthogonal to grating lines of both of said gratings within a plane orthogonal to both of said optical axes;

wherein a stationary grating having a pitch identical to that of said projection grating is disposed at a position near said projection grating so as to form a moire fringe by the stationary grating and projection grating, and a change in thus formed moire fringe caused by the movement of said projection grating is detected so as compute an amount of movement of said projection grating.

10. A moire apparatus according to claim 9, wherein said stationary grating has grating lines intersecting those of said projection grating.

11. A moire apparatus according to claim 9, wherein said change in said moire fringe is detected by detection of illuminance of a single point.

12. A moire apparatus according to claim 9, wherein said change in said moire fringe is detected by means of a plurality of illuminance detecting means.

* * * * *

UNITED STATES PATENT AND TRADEMARK OFFICE
CERTIFICATE OF CORRECTION

PATENT NO. : 6,291,817 B1
DATED : September 18, 2001
INVENTOR(S) : Fumio Kobayashi, Shinichi Matsuda It is certified that error appears in the above-identified patent and that said Letters Patent is hereby corrected as shown below:

<u>Column 14,</u>
Line 6, after "an object" insert -- to be measured, a deformed grating image formed on said object --
Lines 9 and 10, delete "said projection grating, and a moire fringe formed thereby is observed,"
Line 12, delete "orthoganal" and substitute therefore -- orthogonal --
Line 56, delete "with" and substitute therefore -- within --

Signed and Sealed this

Fifth Day of March, 2002

Attest:

JAMES E. ROGAN
*Attesting Officer*     *Director of the United States Patent and Trademark Office*